March 13, 1928.  1,662,764
O. E. TOMAN
BAG HOLDER
Filed April 8, 1927   2 Sheets-Sheet 1
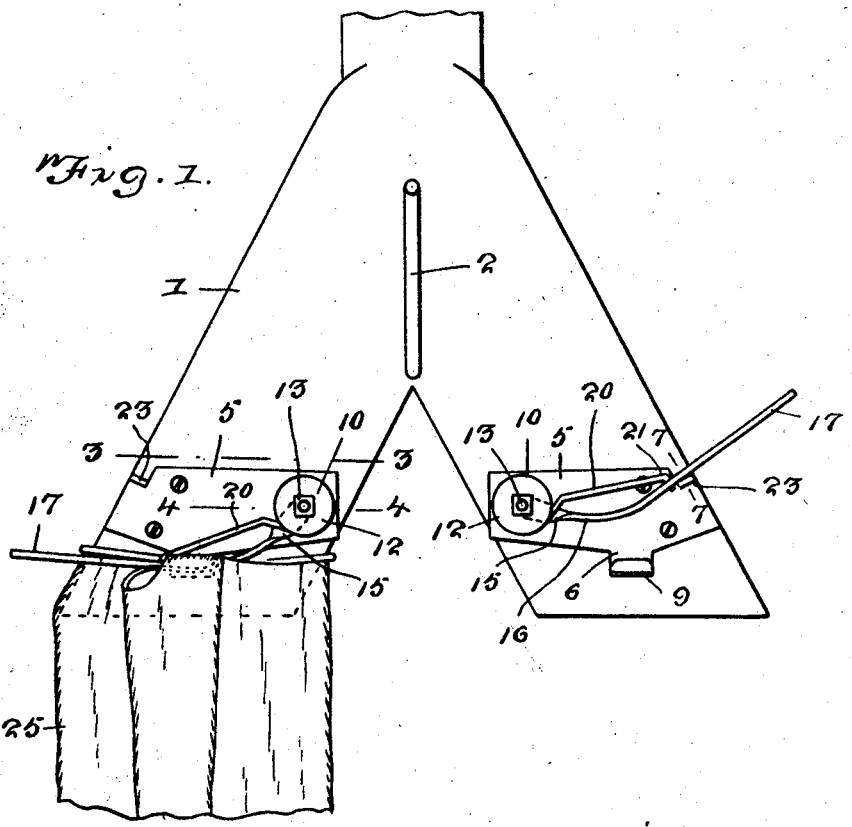
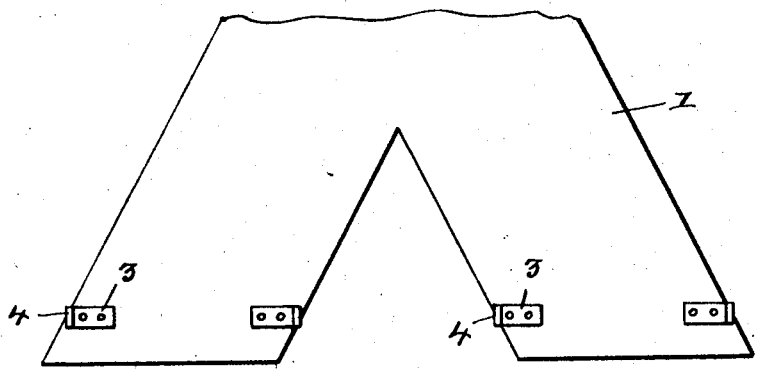
O. E. Toman
INVENTOR
BY Victor J. Evans
ATTORNEY March 13, 1928.   O. E. TOMAN   1,662,764
BAG HOLDER
Filed April 8, 1927   2 Sheets-Sheet 2
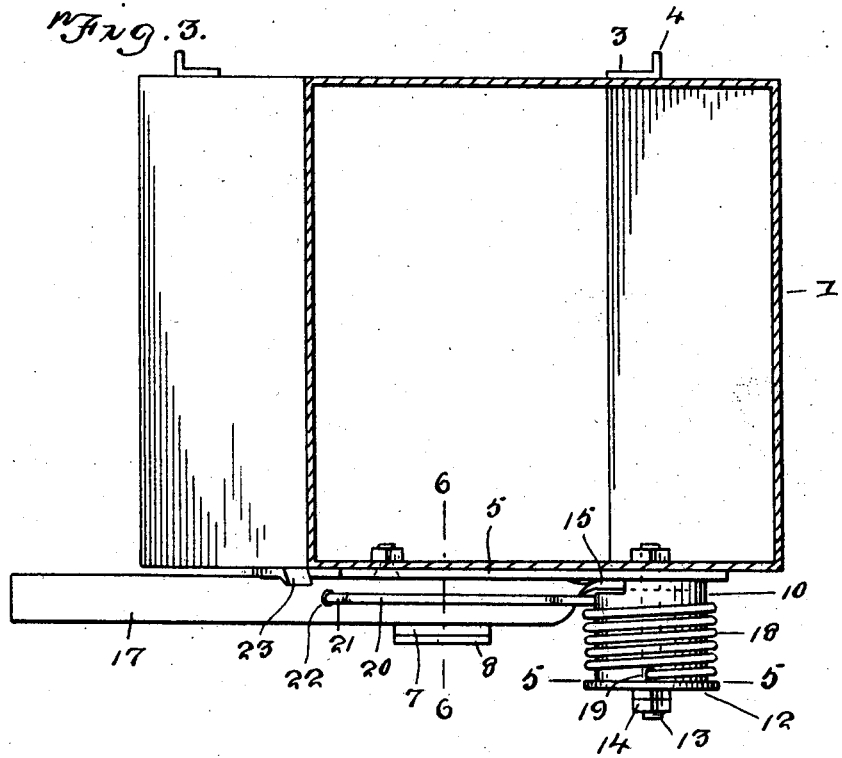
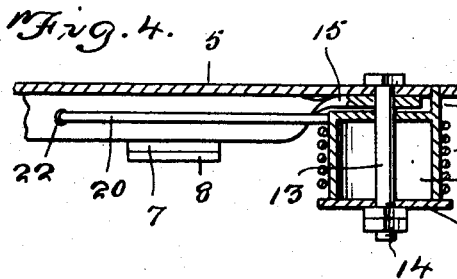
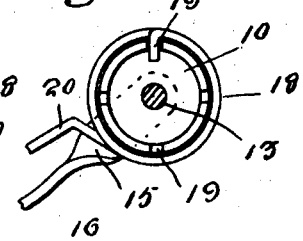
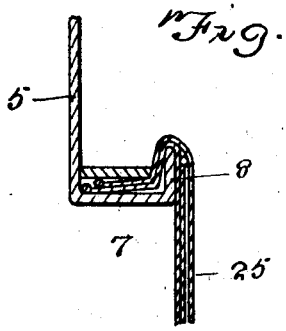
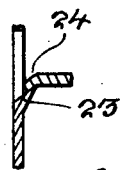
O. E. Toman
INVENTOR
BY Victor J. Evans
ATTORNEY Patented Mar. 13, 1928.

1,662,764

UNITED STATES PATENT OFFICE.

OTTO E. TOMAN, OF PINE CITY, MINNESOTA.

BAG HOLDER.

Application filed April 8, 1927. Serial No. 182,127.

My present invention has reference to a device for holding bags or sacks while being filled, and my object is the provision of a bag holder which is simple in construction and efficient in operation and which will hold bags of different sizes in an easy and effective manner without liability of the tearing of the bag regardless of the weight received therein.

A further object is the provision of a bag holder which can be easily and quickly attached to the outlet end of a hopper or on spouts associated with the grain hopper, weighing machine or the like and which will thereafter remain a permanent part of such spout or hopper.

To the attainment of the foregoing and other objects which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a face view of the outlet spouts of a grain or other hopper provided with the improvement.

Figure 2 is a rear elevation of the construction disclosed by Figure 1.

Figure 3 is an enlarged sectional view approximately on the line 3—3 of Figure 1.

Figure 4 is a detail sectional view approximately on the line 4—4 of Figure 1.

Figure 5 is a sectional view approximately on the line 5—5 of Figure 3.

Figure 6 is a sectional view approximately on the line 6—6 of Figure 3.

Figure 7 is a detail sectional view approximately on the line 7—7 of Figure 1.

The angle outlet spouts for a grain or other hopper are each indicated in the drawings by the numeral 1. The passages between these spouts are controlled by the usual valve that is operated by a handle 2. On what I will term the rear face of the spouts 1, adjacent to the outlet ends thereof, I fix a pair of angle plates 3. The offset or lateral portions of each of these plates, indicated by the numeral 4, is disposed approximately in a line with the sides or edges of the spout and the plates 3 are, of course, in parallelism. The outwardly projecting portions 4 provide hooks to engage a bag or sack, which is arranged over the mouth of the spout.

On the opposite faces of each of the spouts 1 I fix a plate 5. This plate is of a length approximately equalling the width of the spout. Each of the plates 5, at its lower edge, is formed with a reduced depending portion 6, that merges into an outwardly extending flange 7 provided at its end with an upturned lip 8. The flange 7 and the lip 8 thereof provide a hook to engage with the sack in a manner which will presently be described and the lip 8 of the hook has its corners rounded, as indicated by the numerals 9.

On each of the body plates 5, adjacent to the inner ends thereof there is a drum 10. Each drum is hollow and is formed on its inner face with an extension 11 that is received in a notch or depression in the plate 5 whereby the drum is held from turning on the plate and likewise the inner face of the drum is spaced from the plate. Preferably the outer face of each of the drums 10 is open and each of these open ends is closed by a disc 12. Passing through each plate, the drum and the disc 12 there is a bolt 13, the said bolt being engaged by nuts 14 which bear against the discs 10 for holding the same on the drum. The bolt members also provide pivots for the offset ends 15 of the levers of the improvement. Each of the levers is in the nature of a flat plate that is arched, as at 16, to form a straight outer extension 17. The extensions 17 of the levers are designed to be received in the hooks formed on the plates 5, but the said levers are of a less width than the distance between the part 6 and the lips 8 of the hooks.

Wound around each drum 10 there is the coiled portion 18 of a spring. One of the end coils has an offset portion 19 that is received through an opening in the drum, the opposite end coil 20 being directed over the levers and having an offset end received through an offset end 21 that is received through an opening 22 in the respective levers.

The upper corner of each of the plates 5, opposite the end thereof upon which the drums are secured is notched, and the lower walls provided by these notches are formed with upwardly directed substantially V-shaped fingers 23. Each of the levers on its inner edge has an angle depending lug 24 to engage with the finger 23 when the levers are swung to the position disclosed on the right hand side of Figure 1. When the lever is so arranged it will be apparent that there is ample room for the bag or sack over the mouth of the spout. The improvement is designed for holding bags of varying sizes and the portion of each of the bags arranged opposite the hook on the plate 5 is folded upon itself, as shown on the left hand side of Figure 1, and the folded portion at the mouth of the bag is arranged over the lip 8 of the hook 7 and is received directly in the body of the hook, as shown by Figure 6. The lever 17 is then released from its engagement with the stop finger 23, the spring influencing the lever into the hook and into engagement with the folded portion of the bag.

My improvement is of an extremely simple nature which may be cheaply manufactured and easily installed. From experience I have found that the improvement will effectively support sacks or bags without any liability of tearing or any other injury thereto regardless of the weight of the grain or material received in such sacks or bags. The bag or sack may be easily positioned on the improvement and by simply swinging the lever out of the hook 7 the filled sack may be readily removed from the spout. By rounding the corners of the lip of the hook the folded portion of the bag will be pressed against these corners 9 by the spring influenced lever which materially aids in holding the bag on the spout.

Having described the invention, I claim:—

1. A bag holder for a spout or hopper including angle plates fixed on one of the sides of the spout or hopper, adjacent to the mouth thereof, and the lateral portions of said plates being arranged in a line with the edges of said spout or hopper and a flat plate fixed on the opposite face of the spout or hopper, said flat plate having a reduced depending portion on its lower edge which is flanged outwardly and from thence upwardly to provide a hook, the outer lip of the hook having its corners rounded, a pivotally supported spring influenced lever on the plate movable into the hook but of a width not to contact with the outer element of the hook, an angle finger on the plate disposed adjacent to one of the corners thereof, and a lug on the lever engageable with said finger for holding the lever raised away from the hook.

2. A bag holder for a spout or hopper including angle plates fixed on one of the sides of the spout or hopper, adjacent to the mouth thereof, and the lateral portions of said plates being arranged in a line with the edges of the said spout or hopper and a flat plate fixed on the opposite face of the spout or hopper, said flat plate having a reduced depending portion on its lower edge which is flanged outwardly and from thence upwardly to provide a hook, the outer lip of the hook having its corners rounded, a drum on the plate having an extending finger on its inner edge coengaging with the plate and spacing the drum therefrom, a pivot member passing through the plate and drum, a flat lever which is centrally arched and which is twisted to provide an angle end that is journaled on the pivot, a spring wound around the drum having one end secured thereto and its second end extended over and connected to the lever and designed to swing the lever into the hook, a stop finger on the plate and a lug on the inner edge of the lever engageable with the finger for holding the lever elevated on the plate when out of the hook.

In testimony whereof I affix my signature.

OTTO E. TOMAN.